United States Patent
Baracaldo Angel et al.

(10) Patent No.: US 10,708,147 B2
(45) Date of Patent: Jul. 7, 2020

(54) MONITORING DYNAMIC QUALITY OF SERVICE BASED ON CHANGING USER CONTEXT

(71) Applicant: INTERNATIONAL BUSINESS MACHINES CORPORATION, Armonk, NY (US)

(72) Inventors: Nathalie Baracaldo Angel, San Jose, CA (US); Heiko H. Ludwig, San Francisco, CA (US); Rui Zhang, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 15/452,380

(22) Filed: Mar. 7, 2017

(65) Prior Publication Data

US 2018/0262403 A1   Sep. 13, 2018

(51) Int. Cl.
H04L 12/24   (2006.01)

(52) U.S. Cl.
CPC ...... H04L 41/5009 (2013.01); H04L 41/5022 (2013.01); *H04L 41/5054* (2013.01); *H04L 41/5096* (2013.01)

(58) Field of Classification Search
CPC ............. H04L 41/5009; H04L 41/5054; H04L 41/5096
USPC ....................................................... 709/226
See application file for complete search history.

(56) References Cited

U.S. PATENT DOCUMENTS

| | | | |
|---|---|---|---|
| 6,185,565 B1 * | 2/2001 | Meubus | H04Q 3/0029 |
| 8,402,525 B1 * | 3/2013 | Shah | H04L 41/0273 |
| | | | 726/28 |
| 8,782,254 B2 | 7/2014 | Duvvuru | |
| 9,215,159 B2 | 12/2015 | Raleigh et al. | |
| 10,127,530 B1 * | 11/2018 | Swanburg | G06Q 20/102 |
| 2006/0120282 A1 * | 6/2006 | Carlson | H04L 12/2801 |
| | | | 370/229 |
| 2007/0058561 A1 * | 3/2007 | Virgile | H04L 12/14 |
| | | | 370/252 |
| 2009/0010264 A1 * | 1/2009 | Zhang | H04L 47/10 |
| | | | 370/395.21 |
| 2009/0140864 A1 * | 6/2009 | Aaron | G06Q 30/02 |
| | | | 340/573.1 |
| 2011/0258317 A1 | 10/2011 | Sinha et al. | |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — James E Springer
(74) *Attorney, Agent, or Firm* — Sherman IP LLP; Kenneth L. Sherman; Steven Laut

(57) ABSTRACT

One embodiment provides a method for monitoring context-dependent quality of service in a shared computing environment that includes detecting, by a processor, a change in context. Service classes are dynamically assigned to individual users and respective applications within shared computing environment customers based on the change in context. Service level agreement (SLA) statistics for each assigned service class are aggregated and collected.

17 Claims, 7 Drawing Sheets

(56) References Cited

U.S. PATENT DOCUMENTS

| | | | |
|---|---|---|---|
| 2012/0089726 A1* | 4/2012 | Doddavula | G06F 9/5072 709/224 |
| 2013/0051271 A1* | 2/2013 | Cao | H04L 41/5067 370/252 |
| 2014/0089493 A1* | 3/2014 | Bauer | G06F 9/5072 709/224 |
| 2014/0129710 A1 | 5/2014 | Bartfai-Walcott et al. | |
| 2014/0379405 A1* | 12/2014 | Herger | G06Q 10/1095 705/7.19 |
| 2015/0341411 A1* | 11/2015 | Huber | H04L 65/4092 709/231 |
| 2017/0111827 A1* | 4/2017 | Norlin | H04W 28/24 |
| 2017/0347236 A1* | 11/2017 | Frusina | H04M 1/72572 |
| 2018/0191814 A1* | 7/2018 | Kinarti | H04L 67/104 |

OTHER PUBLICATIONS

List of IBM Patents or Applications Treated as Related: Baracaldo Angel, N. et al., U.S. Appl. No. 16/848,692, filed Apr. 14, 2020.

* cited by examiner

| User | Application | Context | Class |
|---|---|---|---|
| Steve | Cloud Meeting | Important Presentation | B |
| Steve | Cloud Meeting | Casual Brainstorming | C |
| Steve | Driving Alert Application | Bad Condition (bad weather, Congestion, etc.) | A |
| Steve | Driving Alert Application | Good Conditions (Good weather, light traffic, etc.) | B |

FIG. 6

MONITORING DYNAMIC QUALITY OF SERVICE BASED ON CHANGING USER CONTEXT

BACKGROUND

For shared computing environments, such as a cloud computing environment, cloud services for enterprises, modern enterprises or businesses include increasingly dynamic/mobile users who experience frequent context changes. There is increasing demand and awareness for Internet of Things (IoT) services across industries where the quality of service (QoS) requirements often vary with contexts. Presentation sharing may be used during a critical meeting, in which case a higher availability requirement (e.g. 99.999%) arises. In another example, using global positioning system (GPS)/map services while driving requires a faster response time requirement.

SUMMARY

Embodiments relate to dynamically assigning differentiated QoS classes to mobile users and their applications as user and external context and requirements change. One embodiment provides a method for monitoring context-dependent quality of service in a shared computing environment that includes detecting, by a processor, a change in context. Service classes are dynamically assigned to individual users and respective applications within shared computing environment customers based on the change in context. SLA statistics within each assigned service class are aggregated and collected.

These and other features, aspects and advantages of the embodiments will become understood with reference to the following description, appended claims and accompanying figures.

BRIEF DESCRIPTION OF THE DRAWINGS

FIG. 6 illustrates a table showing mapping of users to classes, according to one embodiment.

DETAILED DESCRIPTION

Figure 1:
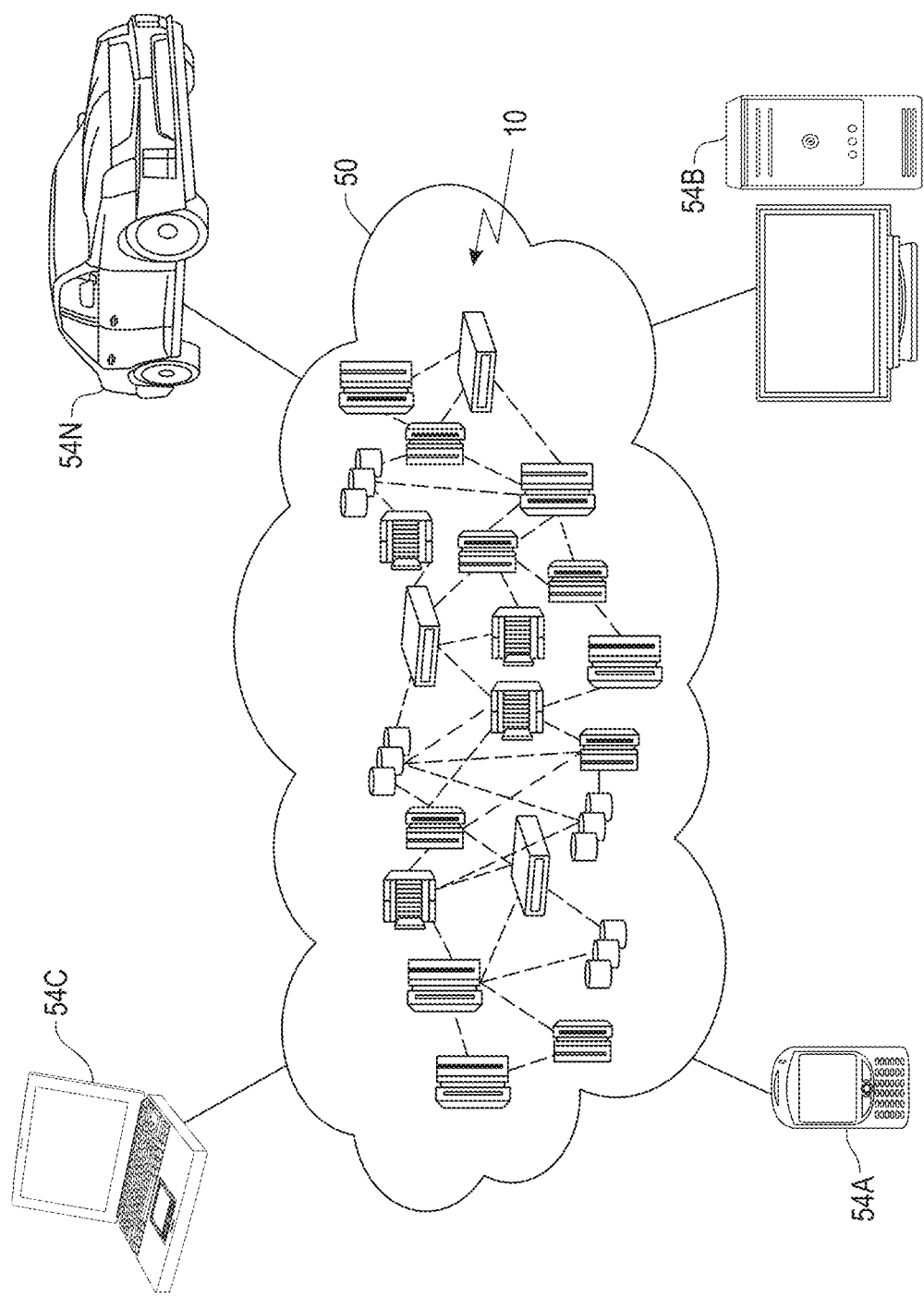
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

One or more embodiments provide for dynamically assigning differentiated QoS classes to mobile users and their applications as user and external context and requirements change. One embodiment provides a method for monitoring context-dependent quality of service in a shared computing environment that includes detecting, by a processor, a change in context. Service classes are dynamically assigned to individual users and respective applications within shared computing environment customers based on the change in context. SLA statistics for each assigned service class are aggregated and collected.

One or more embodiments are directed to providing dynamic QoS classes and SLA compliance tracking as users contexts change. One or more embodiments include a system that dynamically assigns differentiated QoS classes to mobile users and their applications (apps) as their context and requirements change. Each user device executes a context QoS (cQoS) agent (e.g., process, application, etc.) that detects context changes and computes individual-level SLA statistics per current user class and reports them to the cloud or service provider. The Provider dynamically tracks the cQoS groups, as users move from group to group upon context change and computes group-level SLA statistics and compliance. Multiple contextual factors are considered in the processing. When a context changes, in one embodiment the following sequence takes place: 1) the user experiences a context change event, 2) the event is detected by the cQoS agent, 3) the agent reports the event to the provider, 4) the provider determines a class change for the user, the application given the context change from initial context, c1 to a new context, c2, and 5) the provider updates the memberships mapping from c1 and c2 and computes SLA compliance according to the new mappings.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 2:
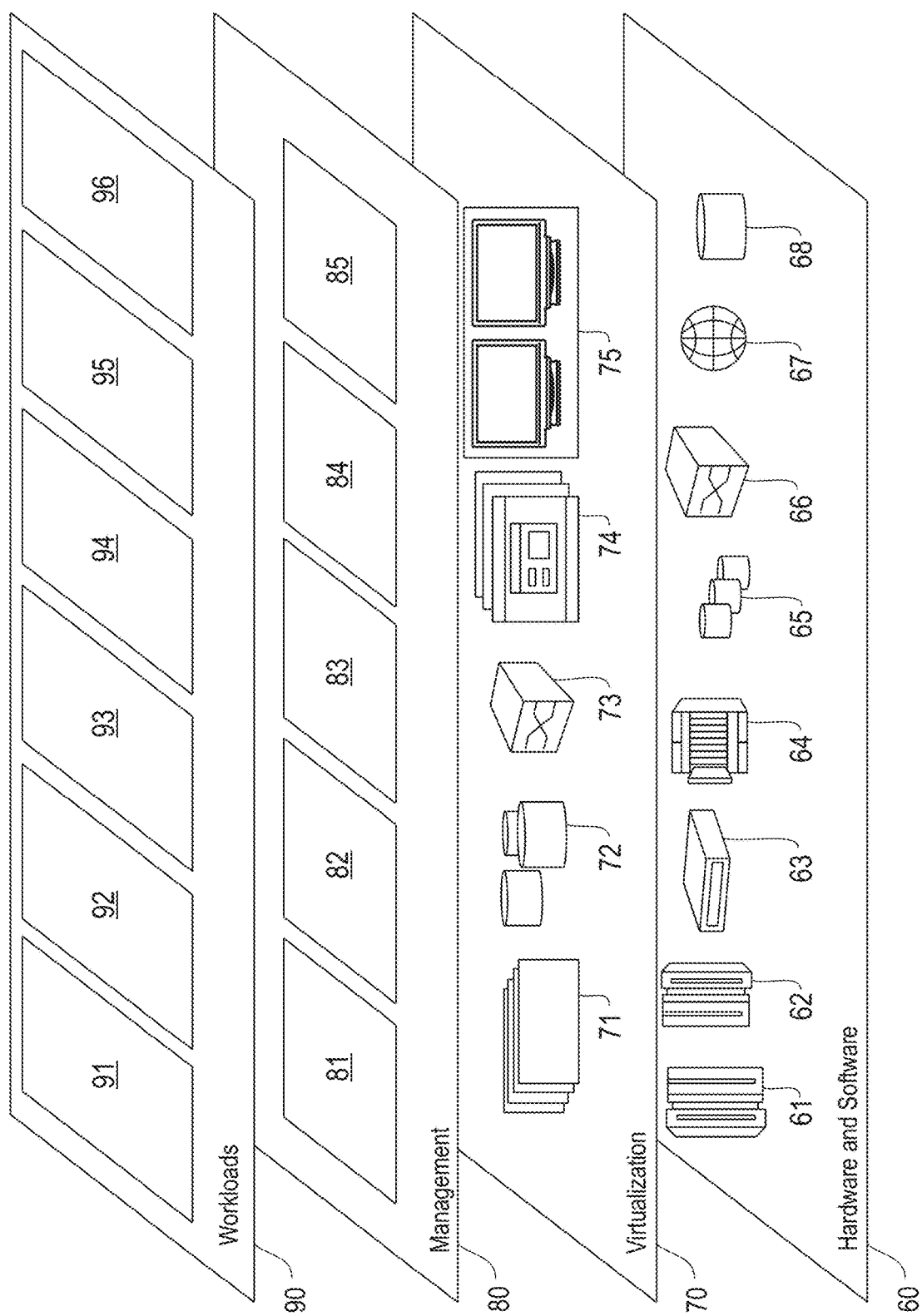
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and dynamically assigning differentiated QoS classes to mobile users and their applications as user and external context and requirements change processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3) or the autonomous cloud environment 410 (FIG. 4), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
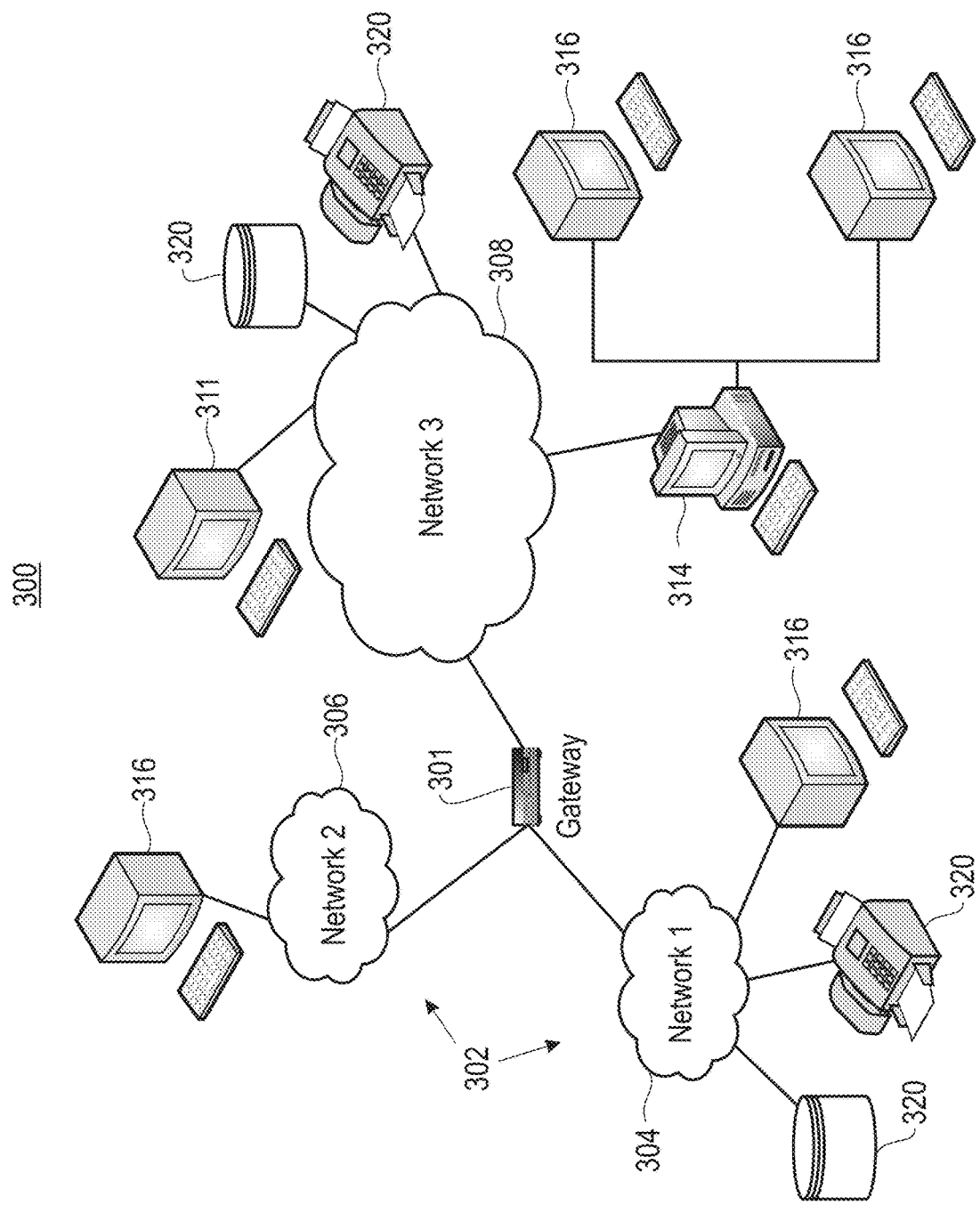
FIG. 3 is a network architecture for efficient representation, access and modification of variable length data objects, according to an embodiment.

FIG. 3 illustrates a network architecture 300, in accordance with one embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 311 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
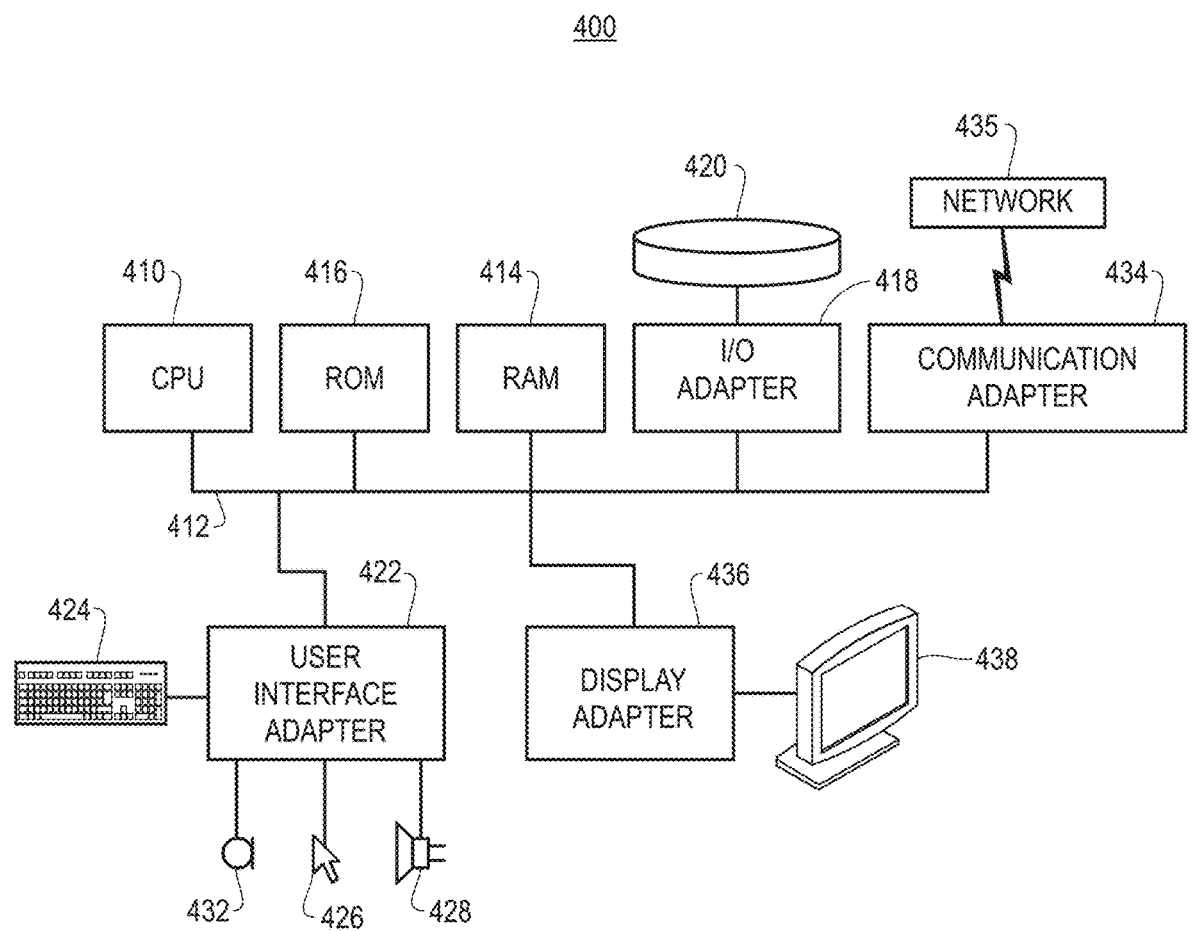
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

Figure 5:
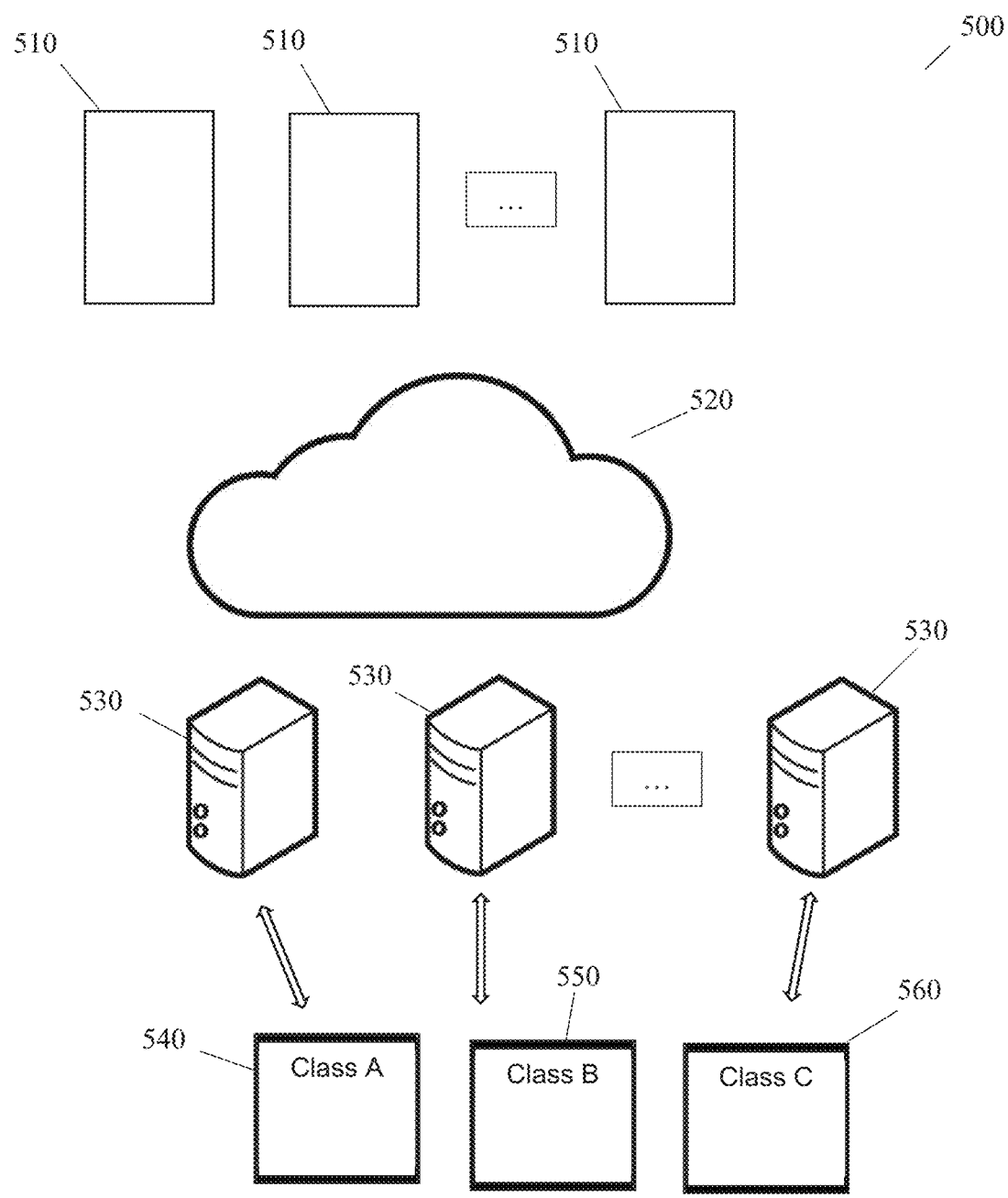
FIG. 5 is a block diagram illustrating a system for dynamically assigning differentiated QoS classes to mobile users and their applications as user and external context and requirements change, according to one embodiment.

FIG. 5 is a block diagram illustrating a system 500 for dynamically assigning differentiated QoS classes to mobile users and their applications as user and external context and requirements change, according to one embodiment. In one embodiment, the system 500 includes user devices 510, such as smart phones, mobile computing devices (e.g., laptops, tablets, etc.), smart wearable devices, vehicle computing devices, etc.), a shared computing environment 520 (e.g., a cloud computing environment), and shared computing (service) providers 530 (e.g., cloud computing providers, cloud servers, etc.).

In one embodiment, the shared computing providers 530 dynamically assign differentiated QoS classes (e.g., class A 540, class B 550, class C 560, etc.) to mobile users of user devices 510 and their executing applications as their context and requirements change (e.g., <user U, app A, context X>←→class C 560), where the symbol "←→" refers to a mapping, such as an application and a context are mapped to a service class. In one embodiment, each user device 510 executes a cQoS agent process that detects context (user context and external context) change, computes individual-level SLA statistics per current user class and reports them to the shared computing provider 530. In one embodiment, the shared computing provider 530 dynamically tracks the cQoS groups, as users move from group to group upon context change, and computes group-level SLA statistics and compliance. In one embodiment, user context may include: events, user engagement, time, location, physical activity, mood or intent, etc. In one embodiment, external context may include: weather condition, device type, etc.

In one embodiment, events may include video/audio sharing during an important meeting versus during a casual collaboration session, and emergency situation: a fire, medical emergency or accident, which may require faster response time, etc. User engagement may include a user actively chatting and lively brainstorming versus background chats at a meeting, etc. Device type may include high resolution display versus smart phone screens (lower SLA requirements), etc. Time may include time of day, day of week, month of year, etc. Location may include whether a user is at work or at home, etc. Physical activity may include sitting, walking, standing, driving or biking, etc. Weather may include sunny versus rain/snow/hail/windy conditions, etc. For driving, higher SLA requirements are needed in difficult conditions due to safety concerns.

In one or more embodiments, an example context change sequence may include:
1) The user experiences a context change event;
2) The event is detected by the cQoS agent executing on a user device 510;
3) The agent reports the event to the shared computing provider 530;
4) The shared computing provider 530 determines a class change for <user U, app A> from class A (cA) to class B (cB); and
5) The shared computing provider 530 updates the memberships mapping of cA and cB and computes SLA compliance according to the new mappings.

In one example embodiment, for a user A has applications X and Y that are executable on user A's mobile device. Upon weather context changing at time T, the change in weather context only is relevant to application X, but not application Y. In one embodiment, based on this change of context, a new class is assigned to user A for application X (i.e., user A/application X pair). The class for user A application Y remains unchanged at time T.

In one embodiment, the system 500 provides scalability. In one embodiment, the scalability may include numerous context events given a large cloud environment deployment: the number of SLAs (customer enterprises), the number of enterprise users per SLA, and the number of events per user, In one embodiment, push-down compliance to agents for certain SLAs (e.g. foreach) may be included for increased scalability where: the agent determines class change based on context events and tracks per-user SLA compliance, only class change (e.g. class C→Class A) and SLA statistics (e.g. 99% availability complaint for this user) are reported to the provider, and context events are not reported. In one embodiment, the system 500 may help clients understand how an entity (e.g., a company, corporation, etc.) is complying with SLAs based on IoT inputs and deliver more relevant, compelling QoS for users of IoT offering.

FIG. 6 illustrates a table 600 showing mapping of users to classes, according to one embodiment. In one example, the table 600 includes a user mapping for "Steve" with an executing application (on a user device 510, FIG. 5), context and an assigned class A, B or C (class A 540, class B 550, class C 560). In the example shown in table 600, user Steve is assigned class B when executing a cloud meeting application where the context is an important presentation. User Steve is also assigned class B when executing a driving alert application (e.g., WAZE®) where the context is good conditions (e.g., good weather, light traffic, etc.). User Steve is assigned class C when executing a cloud meeting application where the context is casual brainstorming. User Steve is assigned class A when executing a driving alert application where the context bad conditions (e.g., bad weather, heavy traffic congestion, emergency road conditions (e.g., blocked lanes, highway closures, etc.), etc.).

Figure 7:
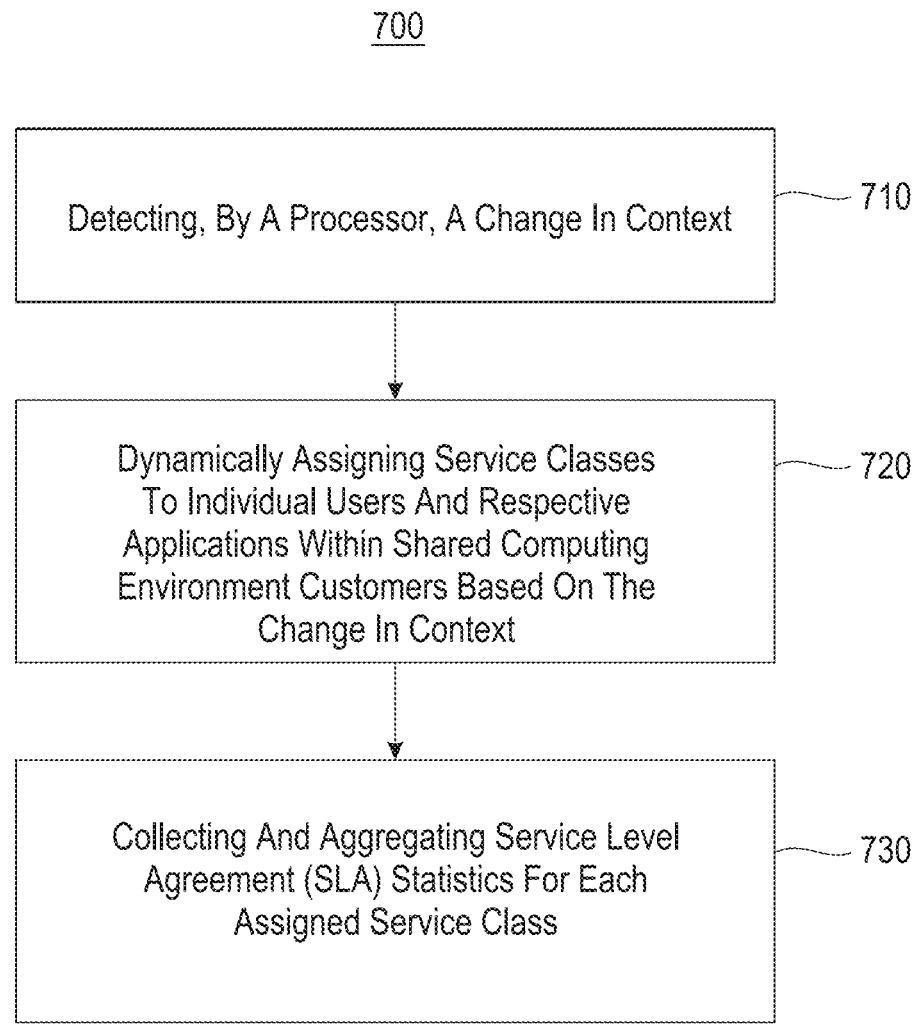
FIG. 7 illustrates a block diagram for a process for dynamically assigning differentiated QoS classes to mobile users and their applications as user and external context and requirements change, according to one embodiment.

FIG. 7 illustrates a block diagram for a process 700 for dynamically assigning differentiated QoS classes to mobile users and their applications as user and external context and requirements change, according to one embodiment. In one embodiment, in block 710 process 700 provides for detecting, by a processor (e.g., a processor in a user device 510, FIG. 5), a change in context. In block 720, process 700 includes dynamically assigning service classes to individual users (of user devices 510) and respective applications (i.e., user/application pairs) within shared computing environment customers based on the change in context. In block 730, process 700 includes collecting and aggregating SLA statistics for each assigned service class.

In one embodiment, for process 700, context may include user context and external context. User context may include: events, engagement levels, user location, time, physical activity and mood, and external context may include at least one of a device type and weather conditions. In one embodiment, the shared computing environment is a cloud computing environment.

In one embodiment, for process 700 each cloud computing environment customer includes one or more individual users of a cloud computing environment service, and each individual user uses one or more applications on their user device. In one embodiment, for process 700 each individual user and application pair is provided one or more service classes by a cloud computing environment provider (e.g., shared computing provider 530, FIG. 5) at any given time. In one embodiment, for process 700 each service class includes one or more SLAs based on aggregate services received by individual users in that service class. In one embodiment, aggregating services includes aggregating based on a statistical function including, but not limited to: an average, a minimum, and a maximum.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for monitoring context-dependent quality of service (QoS) in a shared computing environment comprising:

detecting, by a processor, a change in context, wherein context comprises user context and external context, and user context comprises physical activity, mood, engagement levels and type of events;

updating prior assigned service classes to updated service classes based on the change in context;

updating a table of membership mappings for the change in context and an application from the prior assigned service classes for each of the assigned updated service classes;

dynamically assigning the updated service classes to individual users and respective applications within shared computing environment customers; and collecting and aggregating service level agreement (SLA) statistics for each assigned updated service class;

wherein each assigned service class comprises at least one SLA based on aggregate services received by individual users in that assigned service class, and aggregating SLA statistics comprises aggregating SLA statistics based on a statistical function comprising average, minimum, and maximum.

2. The method of claim 1, wherein at least a portion of the updated service classes include Internet of Things (IoT) service classes.

3. The method of claim 2, further comprising:

determining SLA compliance according to the updated membership mappings; wherein user context further comprises at least one of: user location, or time, external context comprises at least one of: device type or weather condition, and type of events comprises: casual events, formal events and emergency events.

4. The method of claim 3, wherein the shared computing environment comprises a cloud computing environment, determining SLA compliance is based on Internet of Things (IoT) inputs, casual events comprise media sharing during a casual collaboration session, and formal events comprise media sharing during a meeting.

5. The method of claim 4, wherein each cloud computing environment customer comprises one or more individual users of a cloud computing environment service, each individual user uses one or more applications, and emergency events comprise an emergency situation including: a fire, a medical emergency and an accident.

6. The method of claim 5, wherein each individual user and application pair is assigned one or more service classes by a cloud computing environment provider at any given time.

7. A computer program product for monitoring context-dependent quality of service in a shared computing environment, the computer program product comprising a non-transitory computer readable storage medium having program instructions embodied therewith, the program instructions executable by a processor to cause the processor to:

detect, by the processor, a change in context, wherein context comprises user context and external context, and user context comprises physical activity, mood, engagement levels and type of events;

update, by the processor, prior assigned service classes to updated service classes based on the change in context;

update, by the processor, a table of membership mappings for the change in context and an application from the prior assigned service classes for each of the assigned updated service classes;

dynamically assign, by the processor, the updated service classes to individual users and respective applications within shared computing environment customers; and collect and aggregate, by the processor, service level agreement (SLA) statistics for each assigned updated service class, wherein each assigned service class comprises at least one SLA based on aggregate services received by individual users in that assigned service class, and aggregating SLA statistics comprises aggregating SLA statistics based on a statistical function comprising average, minimum, and maximum.

8. The computer program product of claim 7, wherein at least a portion of the updated service classes include Internet of Things (IoT) service classes.

9. The computer program product of claim 7, wherein:

the program instructions executable by the processor further cause the processor to:

determine, by the processor, SLA compliance according to the updated membership mappings;

user context further comprises at least one of: events, user location, or time;

external context comprises at least one of: device type or weather condition; and type of events comprises: casual events, formal events and emergency events.

10. The computer program product of claim 9, wherein the shared computing environment comprises a cloud computing environment, determining SLA compliance is based on Internet of Things (IoT) inputs, casual events comprise media sharing during a casual collaboration session, and formal events comprise media sharing during a meeting.

11. The computer program product of claim 10, wherein each cloud computing environment customer comprises one or more individual users of a cloud computing environment service, each individual user uses one or more applications, and emergency events comprise an emergency situation including: a fire, a medical emergency and an accident.

12. The computer program product of claim 11, wherein each individual user and application pair is assigned one or more service classes by a cloud computing environment provider at any given time.

13. An apparatus comprising:

a memory configured to store instructions; and a processor configured to execute the instructions to:

detect a change in context, wherein context comprises user context and external context, and user context comprises physical activity, mood, engagement levels and type of events;

update prior assigned service classes to updated service classes based on the change in context;

update a table of membership mappings for the change in context and an application from the prior assigned service classes for each of the assigned updated service classes;

dynamically assign the updated service classes to individual users and respective applications within shared computing environment customers; and collect and aggregate service level agreement (SLA) statistics for each assigned updated service class;

wherein each assigned service class comprises at least one SLA based on aggregate services received by individual users in that assigned service class, and aggregating SLA statistics comprises aggregating SLA statistics based on a statistical function comprising average, minimum, and maximum.

14. The apparatus of claim 13, wherein at least a portion of the updated service classes include Internet of Things (IoT) service classes.

15. The apparatus of claim 14, wherein:
   the processor is further configured to execute the instructions to:
      determine SLA compliance according to the updated membership mappings;
   user context further comprises at least one of: events, user location, or time;
   external context comprises at least one of: device type or weather condition; and
   type of events comprises: casual events, formal events and emergency events.

16. The apparatus of claim 15, wherein the shared computing environment comprises a cloud computing environment, each cloud computing environment customer comprises one or more individual users of a cloud computing environment service, each individual user uses one or more applications, SLA compliance is determined based on Internet of Things (IoT) inputs, casual events comprise media sharing during a casual collaboration session, and formal events comprise media sharing during a meeting.

17. The apparatus of claim 16, wherein each individual user and application pair is assigned one or more service classes by a cloud computing environment provider at any given time, and emergency events comprise an emergency situation including: a fire, a medical emergency and an accident.

* * * * *